(12) United States Patent
Day et al.

(10) Patent No.: US 8,239,701 B2
(45) Date of Patent: Aug. 7, 2012

(54) METHODS AND APPARATUS FOR POWER ALLOCATION IN A STORAGE SYSTEM

(75) Inventors: Brian A. Day, Colorado Springs, CO (US); Brad D. Besmer, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 502 days.

(21) Appl. No.: 12/510,699

(22) Filed: Jul. 28, 2009

(65) Prior Publication Data

US 2011/0029787 A1 Feb. 3, 2011

(51) Int. Cl.
G06F 1/26 (2006.01)
(52) U.S. Cl. .................. 713/324; 713/323; 713/340
(58) Field of Classification Search .............. 713/323, 713/324, 340
See application file for complete search history.

(56) References Cited

U.S. PATENT DOCUMENTS

| | | | |
|---|---|---|---|
| 4,811,216 A | 3/1989 | Bishop et al. | |
| 4,862,342 A | 8/1989 | Dhyanchand | |
| 4,964,040 A | 10/1990 | Wilcox | |
| 5,317,757 A | 5/1994 | Medicke | |
| 5,357,632 A | 10/1994 | Pian et al. | |
| 5,367,678 A | 11/1994 | Lee et al. | |
| 5,432,908 A | 7/1995 | Heddes et al. | |
| 5,434,970 A | 7/1995 | Schiffleger | |
| 5,442,789 A | 8/1995 | Baker et al. | |
| 5,483,656 A * | 1/1996 | Oprescu et al. | 713/320 |
| 5,553,073 A | 9/1996 | Barraclough et al. | |
| 5,553,305 A | 9/1996 | Gregor et al. | |
| 5,623,634 A | 4/1997 | Liu | |
| 5,630,132 A | 5/1997 | Allran et al. | |
| 5,838,766 A | 11/1998 | Rand | |
| 6,092,098 A | 7/2000 | Araki | |
| 6,233,630 B1 | 5/2001 | Wilhelm, Jr. | |
| 6,408,394 B1 * | 6/2002 | Vander Kamp et al. | 713/300 |
| 7,284,244 B1 | 10/2007 | Sankaranarayan | |
| 7,506,808 B2 | 3/2009 | Silverbrook et al. | |
| 7,555,666 B2 * | 6/2009 | Brundridge et al. | 713/340 |
| 2002/0013832 A1 | 1/2002 | Hubbard | |
| 2002/0018481 A1 | 2/2002 | Mor et al. | |
| 2005/0210159 A1 | 9/2005 | Voorhees et al. | |
| 2005/0268010 A1 | 12/2005 | Igari | |
| 2006/0031612 A1 | 2/2006 | Bashford et al. | |
| 2006/0184287 A1 | 8/2006 | Belady et al. | |
| 2009/0204826 A1 | 8/2009 | Cox et al. | |

OTHER PUBLICATIONS

Eymann et al., "Decentralized vs. Centralized Economic Coordination of Resource Allocation in Grids," Polytecnic University of Catalina, Barcelona, France.

* cited by examiner

*Primary Examiner* — Thuan Du
(74) *Attorney, Agent, or Firm* — Duft Bornsen & Fishman LLP

(57) ABSTRACT

Methods and systems for improved management of power allocation among a plurality of devices coupled to a controller. The controller and devices exchange messages to request, grant, and release allocations of power from a common power supply. In some embodiments, the controller may be a SAS/SATA controller and the messages exchanged may be SAS/SATA frames and/or primitives. In exemplary embodiments, the messages may request/grant a particular amount of power for each of one or more voltage levels provided by the power supply. In other exemplary embodiments, the messages may designate the duration of time during which the requesting device may utilize the allocated power. A power status message from the device to the controller may indicate a change in the power consumption by the device. Responsive to the power status message the controller may re-allocate power previously allocated to a device that has completed use thereof.

19 Claims, 3 Drawing Sheets

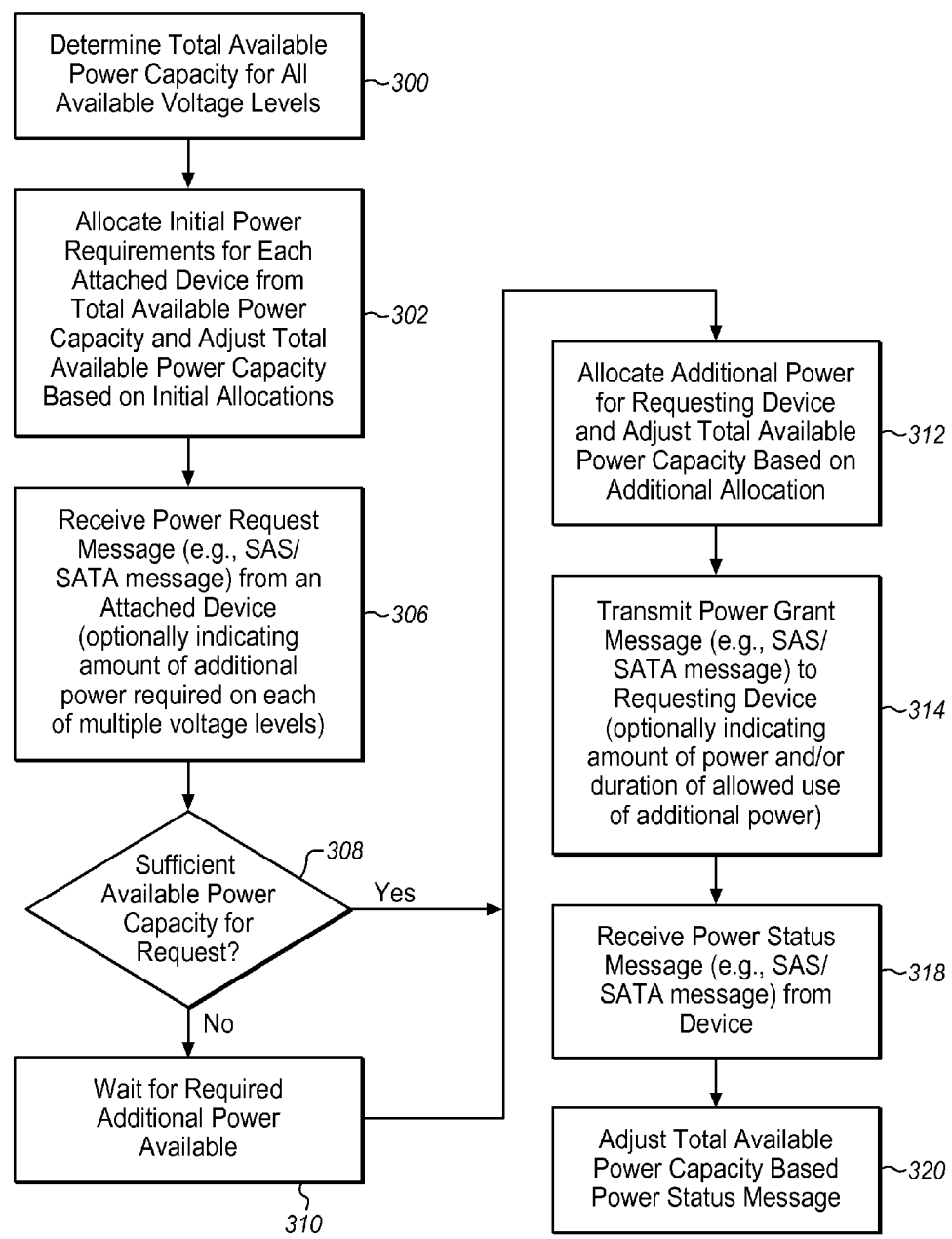

ered, wherein a device is allocated power from the total available power capacity.

METHODS AND APPARATUS FOR POWER ALLOCATION IN A STORAGE SYSTEM

BACKGROUND

1. Field of the Invention

The invention relates generally to management of power consumption by devices and more specifically relates to management of power consumption by a plurality of devices coupled to a common power supply and a controller.

2. Discussion of Related Art

In a variety of electronic systems, a shared power source is used to power a number of devices of the system under control of a common control unit. For example, in storage systems a storage controller may controllably coordinate the application power from a power supply to each of a plurality of storage devices. In particular, each of the storage devices may be, for example, a rotating disk drive. Such devices may utilize minimal power when initially applied but may then consume substantially more power as the disk drive's motor starts to spin the rotating storage media within the disk drive. Though the disk drive consume less power once the motor has reached the desired rotational speed (i.e., in steady state operation), for a burst of time the disk drive may require substantially more power to commence and complete its initialization.

In many present-day storage systems including, for example, a SCSI architecture (including Serial Attached SCSI-SAS) system, a controlling device coupled with the storage devices may utilize command structures and/or protocol primitives/sequences to control and sequence the "spin-up" of each storage device under its control. Such controlling devices may include, for example, a storage controller (e.g., SCSI, SAS, or SATA controller), a SAS expander, a SATA port multiplier, etc. The controlling device may, for example, limit the number of SCSI disk drives enabled to spin-up at any given point in time until eventually all disk drives are started and spinning. Thus a SCSI/SAS storage controller may limit the spin-up power requirements for the plurality of disk drives under its control. However, the storage controller has no knowledge of how long the SCSI disk drive may require the added power to complete initialization. Thus, present SCSI/SAS storage controllers presume a worst case scenario allowing a maximum possible time duration for the initialization of each SCSI disk drive coupled thereto. This solution may cause a significant, unnecessary delay in the initialization of the storage system and hence delays in access to the storage system by attached host systems.

In some storage system environments, the storage devices may be coupled to multiple controlling devices or may autonomously change their power consumptions status. Further, the controlling device may not even be coupled in the same power domain to allow it to have knowledge of the available power status of the storage devices. In such cases, a simple command structure may not suffice to allow the controlling device to coordinate and sequence the power consumption of the storage devices. These problems are further exacerbated in the context of Serial Advanced Technology Attachment (SATA) disk drives. Though SCSI/SAS and SATA standards provide a command structure to allow controlled startup of disk drives coupled to a compliant controlling device, SATA protocols provide no non-command oriented techniques to allow a controlling device to coordinate power consumption of the devices. Thus SATA controllers and port multipliers as controlling devices may lack the ability to effectively coordinate the application of power to SATA storage devices coupled thereto. Present storage systems utilizing SATA disk drives therefore typically provide a significantly oversized (excess capacity) power supply to allow for worst case power consumption if all SATA. Such an oversized power supply adds cost/complexity to the storage system.

Thus it is an ongoing challenge to manage power distribution in a system comprising a plurality of devices requiring bursts of power during initialization.

SUMMARY

The present invention solves the above and other problems, thereby advancing the state of the useful arts, by providing methods and systems for managing power allocation from a common power supply to a plurality of devices under control of a controller. The controller and devices exchange messages to control allocation of power to the plurality of devices. A device transmits a power request message to the controller. The controller maintains an indicator of presently available power capacity from the power supply. If the presently available power capacity is sufficient to grant the device's request, a power grant message is transmitted from the controller to the requesting device and the presently available power capacity is updated to reflect the allocation. In some embodiments, a power status message may be sent from a device to the controller indicating a change in the power consumption of the device. For example, when a device completes its use of additional power, a power status message may be sent to the controller to indicate that the previously allocated additional power is no longer required.

In one exemplary embodiment, the controller may be a SAS/SATA controller and the devices may be SAS/SATA storage devices such as rotating disk drives. When a storage device requires additional power (e.g., to spin-up the motor for the rotating storage medium), it requests additional power from the controller. When the controller grants the additional power, the storage device may then spin-up the motor. In some exemplary embodiments, when the additional power is no longer required (e.g., the rotating storage media have reached steady state rotational speed), the device may transmit a power status message to the controller to permit the controller to re-allocate the freed additional power capacity. In some exemplary embodiments, the messages exchanged may be SAS/SATA frames and/or primitives.

In one aspect hereof, a method is provided in a system comprising a controller and a plurality of devices coupled to the controller. The method manages power applied to each of the plurality of devices communicatively coupled to the controller. The method includes allocating, within the controller, an initial power amount to each of the plurality of devices and receiving a power request message in the controller from a device. The method then determines, within the controller, whether sufficient power capacity is presently available. Responsive to determining that sufficient power capacity is presently available, the method then includes allocating, within the controller, the additional power to the device, and transmitting a power grant message from the controller to the device to grant the device permission to use the allocated additional power.

Another aspect hereof provides a method for managing power allocation in a storage system. The storage system comprising a storage controller coupled to a plurality of storage devices using a communication medium and protocol. The method operable in the storage controller. The method includes determining a total available power capacity, allocating an initial power amount to each of the plurality of storage devices, and adjusting the total available power capacity based on the sum of the initial power amount allocated to each of the plurality of storage devices. The method then receives a power request message from a requesting device of the plurality of devices requesting an additional power amount. The method then determines whether the total available power capacity is sufficient to provide the requested additional power amount. Responsive to a determination that the total available power capacity is sufficient to provide the requested additional power amount, the method then includes allocating the requested additional power amount for the requesting device, transmitting a power grant message to the requesting device, and adjusting the total available power capacity based on the requested additional power amount.

Yet another aspect hereof provides system comprising a power supply, a plurality of devices each device coupled to receive power from the power supply and each adapted to require varying amounts of power during operation, and a SAS controller communicatively coupled with each of the plurality of devices. The controller is adapted to exchange SAS information with one or more devices of the plurality of devices to manage the consumption of power from the power supply consumed by the one or more devices.

BRIEF DESCRIPTION OF THE DRAWINGS

FIG. 3 is a flowchart describing another exemplary method in accordance with features and aspects hereof to manage allocation of power for a plurality of devices coupled to a controller.

DETAILED DESCRIPTION OF THE DRAWINGS

Figure 1:
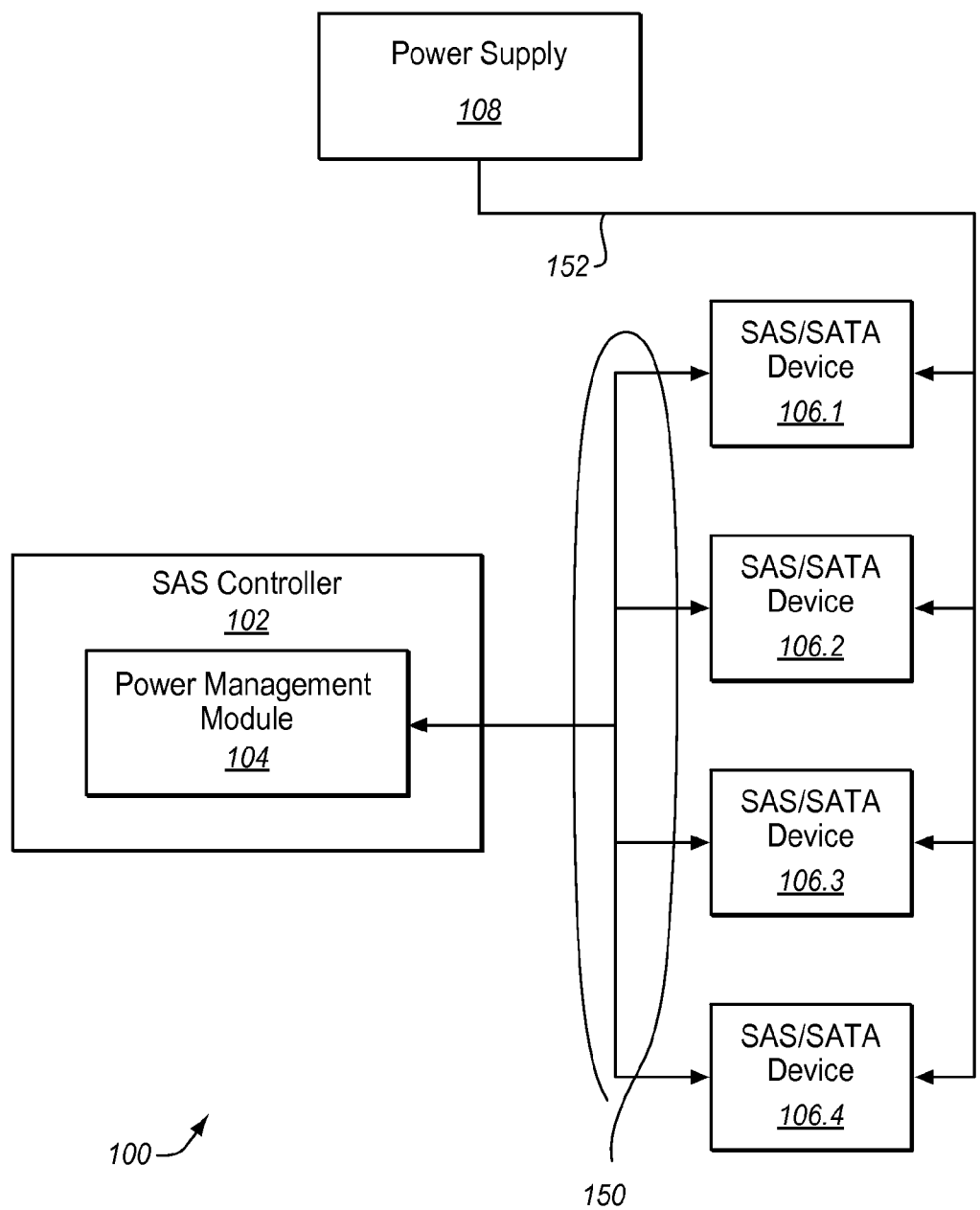
FIG. 1 is a block diagram of an exemplary system adapted in accordance with features and aspects hereof to manage power allocation to a plurality of devices coupled to a common controller and a common power supply source.

FIG. 1 is a block diagram of a system 100 enhanced in accordance with features and aspects hereof to manage power consumption by one or more devices 106.1 through 106.4 coupled to the controller. System 100 may include a power supply 108, a SAS controller 102, and one or more devices 106.1 through 106.4 each coupled with the power supply 108 and coupled with the SAS controller 102. Each device 106.1 through 106.4 may receive one or more voltage levels via signal path 152 from power supply 108. SAS controller 102 may include power management module 104 coupled to communicate with SAS devices 106.1 through 106.4 via paths 150. Though referred to herein as a "SAS" controller, storage controller 102 may be any suitable controlling device including, for example, SAS/SATA storage controllers, SAS expanders, SATA port multipliers, etc.

In one exemplary embodiment, devices 106.1 through 106.4 may be SAS/SATA devices such as disk drives or other storage devices. In such an embodiment, communication path 150 represents any suitable SAS or SATA standards compliant communication medium. Power management module 104 communicates with devices 106.1 through 106.4 to manage the power consumption of each of the devices sharing the common power source from power supply 108. More specifically, power management module 104 exchanges information (e.g., control and status information) with devices 106.1 through 106.4 to manage the amount of power consumed by any of devices 106.1 through 106.4 and/or the timing or sequencing of the power consumption by the various devices 106.1 through 106.4.

SAS controller 102 may be any suitable computing device acting in the role of a SAS controller communicating with one or more SAS/SATA devices 106.1 through 106.4. In one exemplary embodiment, SAS controller 102 may be a SAS initiator. In other embodiments, SAS controller 102 may be a SAS expander. In some exemplary embodiments, power management module 104 may be suitably programmed instructions executed by a general or special purpose processor within SAS controller 102. In other embodiments, power management module 104 may be implemented as customized circuits and/or combinations of custom circuits and suitably programmed instructions. Thus power management module 104 represents any suitable control structure for interacting with the devices 106.1 through 106.4 to manage the power consumption by the various devices.

In the exemplary embodiment of FIG. 1, the information exchanged between power management module 104 and the various devices 106.1 through 106.4 may be SAS frames, SAS primitives, and/or SATA frames. As discussed further herein below, the SAS/SATA information so exchanged may include a request message from a device 106.1 through 106.4 directed to the power management module 104 within SAS controller 102 requesting an allocation of power for the device. In one exemplary embodiment, the request message may indicate an amount of additional power required by the device. For example, during spin-up operation of a rotating disk drive, additional power is required by the disk drive until the rotating media reaches steady-state controlled speed. In such a case, the device would issue a request message to the power management module 104 of SAS controller 102 requesting an allocation of additional power for operation of the device requesting device.

Although power management module 104 of SAS controller 102 does not (necessarily) physically control application of power to devices 106.1 through 106.4 from power supply 108 via path 152, a requesting device would none the less await receipt of a grant message from the power management module 104 of SAS controller 102. A grant message may be transmitted from the SAS controller 102 when it determines that sufficient power capacity is presently available to satisfy the requesting device's power request message. In one exemplary embodiment the grant message may indicate the particular amount of power allocated to the requesting device if less than the requested amount is presently available. In still other embodiments, the grant message may indicate the duration of time during which the requesting device may utilize the allocated additional power. Still other embodiments may utilize a grant message to indicate particular amount of additional power and/or duration of that additional power for each of multiple voltage levels available from the power supply 108.

In still other exemplary embodiments, a power status message may be generated by the device 106.1 through 106.4 and transmitted back to the SAS controller 102. Such a power status message may indicate, for example, a change in the status of the corresponding device as regards its power consumption. For example, a power status message may be transmitted from the device to the storage controller when the previously requested and granted additional power is no longer required. In such a case, the storage controller may return the previously allocated power capacity to accumulated total of available power capacity for potential allocation to other devices.

System 100 of FIG. 1 and equivalent structures noted above, improve upon prior techniques by allowing the SAS controller 102 (through its power management module 104) to more precisely and rapidly sequence the power up (spin-up) processing of each of multiple storage devices 106.1 through 106.4 coupled to the SAS controller 102. The controller 102 may receive requests from each device when the device is ready for spin-up processing and may then sequence the granting of power to each requesting device so as to maximize utilization of the available power from power supply 108 while assuring that no more than the available capacity power capacity is ever granted. Still further, the power status messages received by the SAS controller from devices 106.1 through 106.4 may permit the SAS controller to more tightly control the timing of the sequence of spin-up of multiple disk drives (devices 106.1 through 106.4). The storage controller need not wait, as presently practiced, for a maximum delay before presuming the device has completed its spin-up processing. In such an exemplary embodiment, the storage controller 102 may permit another device to commence spin-up processing immediately upon sensing completion from the power status message of a prior device completing its spin-up processing.

The management of power allocation by power management module 104 may be implemented in one exemplary embodiment through use of a counter function/structure in the power management module 104 of controller 102. Such a counter may initialized to indicate the maximum available power. Multiple counters may also be initialized representing the maximum power available for each of multiple voltage levels supplied by the power supply 108. The initial, maximum available power (for each voltage level provided by the supply 108) may be configured as a parameter in the controller 102 at time of manufacture of system 100, may be dynamically configured by an administrative user of system 100, or may be dynamically determined by exchanges between the controller 102 and the supply 108 via an appropriate data path therebetween (not shown).

As power is allocated to a device, the counter/counters are decremented by the amount of power granted to a device. When the device has completed use of the allocated power (or otherwise indicates a change in its power consumption status), the counter/counters may be appropriately incremented to indicate reduced power consumption and thus allowing the presently available power to be allocated to other devices without waiting for a maximum timeout for use of the additional power by a device. Thus the counter/counters are updated in response to the various messages exchanged to maintain a record of the presently available power from the supply 108.

Numerous additional and equivalent modules and elements in a fully functional system 100 of FIG. 1 will be readily apparent to those of ordinary skill in the art. Such equivalent and additional features are omitted herein for simplicity and brevity of this discussion. In particular, those of ordinary skill in the art will readily recognize that any number of devices 106 may be coupled to the SAS controller 102. Thus the depiction of four exemplary devices is merely intended to suggest one possible configuration of system 100 coupling multiple devices 106 with a SAS controller 102. Still further, those of ordinary skill in the art will readily recognize that a variety of voltage levels may be provided by power supply 108 for application to the devices 106.1 through 106.4. Each voltage level may be associated with a corresponding presently available capacity counter and thus the request and grant information exchanged between the SAS controller 102 and the devices 106.1 through 106.4 may include indicia of the particular voltage level or levels requested and granted.

Figure 2:
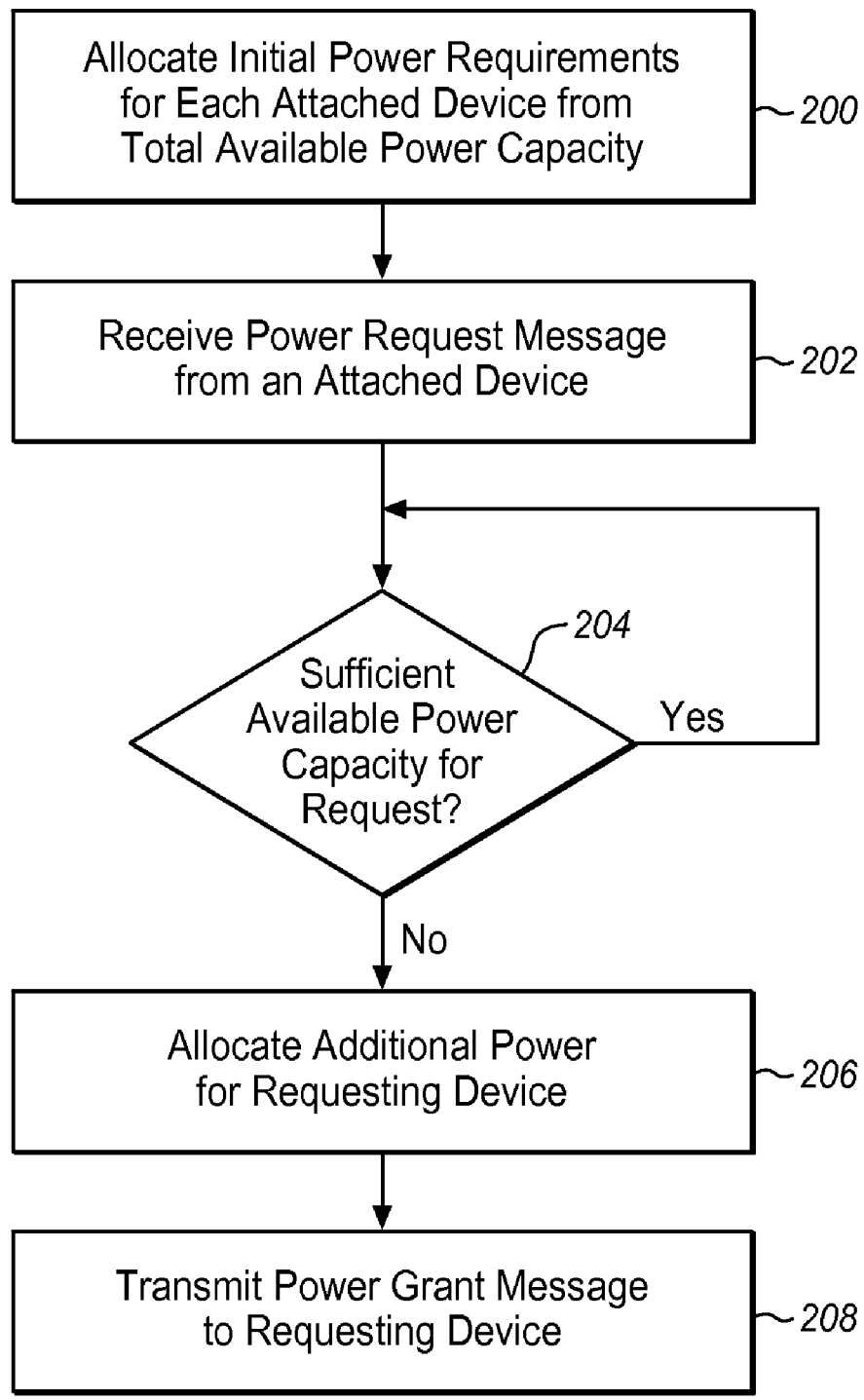
FIG. 2 is a flowchart describing an exemplary method in accordance with features and aspects hereof to manage allocation of power for a plurality of devices coupled to a controller.

FIG. 2 is a flowchart describing an exemplary embodiment in accordance with features and aspects hereof to permit improved management of power allocation for a plurality of devices coupled to a common power supply source and a storage controller. The method of FIG. 2 may be operable, for example, in a system such as a system 100 of FIG. 1. More specifically, the method of FIG. 2 may be performed by a power management module operable within a storage controller of the system as exemplified in FIG. 1.

Step 200 first accounts for an initial power allocation for each attached device from the total available power capacity. In one exemplary embodiment a counter may be initialized to represent the total available power from the power supply. There may be one counter for each available voltage level generated by the power supply. The total available power capacity (e.g., for each voltage level) may be predetermined and preconfigured as noted above and/or may be dynamically determined by communications with the power supply. An initial allocation of power for each of the devices accounts for the minimal power requirements for each device to allow control electronics of each device to begin processing to permit communications with the controller. In the case of a disk drive device coupled to the controller, the initial power allocation would typically not include the additional power capacity required to spin-up the rotating disc media. Rather, the initial power allocation may account only for the computational logic that controls the device to enable minimal communications with the storage controller or only for normal steady state operation of the device following initial spin-up.

Step 202 then receives a power request message from an attached device. As noted above, the message may be encoded as a SAS/SATA frame and/or primitive. In one exemplary embodiment, the power request message may represent a standardized request for allocation of a standardized amount of power and need not specify the specific amount of power required. The standardized amount of power may be predetermined and preconfigured by the system designer/manufacturer or by an administrative user. In other exemplary embodiments, the power request message may specify the amount of additional power being requested for further operations of the device. In a still further exemplary embodiment, the power request message may indicate a particular amount of power required for each of multiple voltage levels provided by the power supply.

Step 204 then determines whether there is presently sufficient available power capacity from the power supply to satisfy the additional power request received from an attached device. As noted above, where the power request message indicates a specific amount of power from each of multiple available voltage levels, step 204 determines whether the requested additional capacity is available from all identified voltage levels. If not, processing continues looping on step 204 until sufficient available capacity is restored. Processing of step 204 may be implemented as a thread programming paradigm in that a particular request may await sufficient available power while other requests, processed in other threads, may be satisfied (e.g., because they require less power). Thus the simple looping structure exemplified in step 204 will be understood by those of ordinary skill in the art to represent such a simple loop structure as well as more common multiple threads or multiple task programming paradigms or implementations.

Once sufficient available power capacity has been identified, step 206 allocates the additional power requested by the requesting device. As noted above, where the power request message identified a particular amount of power capacity and/or particular voltage levels associated with each requested capacity, the allocation by step 206 may account for the allocation of power for each of the one or more voltage levels (e.g., as above, appropriate counters are decremented). Further, where the granted additional power capacity is for a limited duration of time, processing of step 206 may also note the expected time for expiration of utilization of the additional power. The processing of step 206 generally entails recording the power capacity presently allocated to each of the plurality of devices and/or the duration of time for which a particular level of power allocation has been granted. Suitable table structures within the power management module of the controller may be used for such recordation purposes. Thus the controller need not necessarily physically control the application and utilization of the designated power capacity but rather merely account for or record the allocation of power to each of the plurality of devices as well as the presently available capacity from the power supply.

Step 208 then transmits a power grant message to the requesting device indicating that the requested additional amount of power has been granted. Where the amount granted is different than the originally requested amount (or in other suitable circumstances) the power grant message may indicate the particular amount of power capacity being granted to the requesting device. In like manner, the power grant message may include the duration of time during which the allocated power capacity may be utilized. Still further, the power grant message may indicate an amount and/or a duration of time for power associated with each of multiple voltage levels provided by the power supply.

In one exemplary embodiment, the additional power capacity allocated to the requesting device may be automatically allocated and automatically recovered for subsequent reallocation after a predetermined fixed period of time. For example the predetermined fixed period of time may be that duration of time indicated in a power grant message from the controller to a requesting device. Or, for example, in another exemplary embodiment, the duration of time may be a fixed maximum time that any device may require usage of the requested additional power. In other embodiments as discussed further herein below, the device may send a message to the controller to indicate, among other indicia, when it has completed use of any additional power allocated to it.

FIG. 3 is a flowchart describing another exemplary method in accordance with features and aspects hereof for managing allocation of power capacity among a plurality of devices coupled to a controller and sharing a common power supply source. The method of FIG. 3 may be performed, for example, within a system such as system 100 of FIG. 1.

Step 300 first determines the total available power capacity for all available voltage levels supplied by the power supply source coupled with the plurality of devices. As noted above, the determination of total available power capacity may be through factory defined or administrative user defined configuration parameters stored in the controller or, in alternative embodiments, may be determined by querying a data port associated with the power supply source.

Step 302 then allocates from the determined total available power capacity an initial power allocation for each attached device. As noted above, the initial power allocation is that minimal power required for the device to commence initialization to a point of allowing communication with the controller attached thereto. For example, in the context of a rotating disk drive storage device, the initial power allocation may be the amount of power required in initialization up to but excluding actuation of the head actuator mechanism and/or activation of the motors for rotating the storage media. This minimal initial power allocation amount is that which is sufficient to enable communication between the rotating disk drive storage device and the storage controller managing the power allocation. The amount of the initial power allocation required for each of the plurality of devices may be determined with reference to static configuration information provided by the manufacturer of the storage system or may be determined by administrative user input configuring the initial power allocation required for each device coupled to the controller. Still further, in some embodiments, the controller may query each of the devices to determine characteristics such as the initial required power allocation amount.

Step 302 also appropriately adjusts the total available power capacity based on the initial allocations of power to each of the plurality of devices by decreasing the remaining presently available power capacity. As noted above, a counter may be used for each voltage level provided by the power supply. The counters are adjusted (i.e., decremented) for the initial power allocation for each voltage level required for startup of each of the devices.

Step 306 next receives a power request message from an attached device. As noted above, the message may be encoded as SAS/SATA messages including, for example, SAS/SATA frames and/or primitives. Additionally, the power request message received by the controller from a device may include indicia of the amount of additional power required by the requesting device. Still further, the power request message may indicate an amount of additional power required for each of multiple voltage levels provided by the power supply coupled to the device. For example, a rotating disk drive storage device may require +12 volt power and +/−5 volt power for different purposes and applications within the device.

Step 308 then determines whether the presently available power capacity (e.g., for each of multiple voltage levels) is sufficient to satisfy the request. The test of step 308 may determine whether sufficient power is available for each of multiple voltage levels where the power request message indicates a need for power on each of multiple voltage levels. If sufficient power is not presently available to satisfy the request, step 310 represents processing to wait for the required additional power to become available. In one exemplary embodiment, the controller may determine that previously allocated additional power for a device is again available after a predetermined amount of time has passed since the allocation was granted. In other exemplary embodiments as discussed further herein below, a message received from the device may be utilized to indicate that previously allocated additional power is no longer required by the device. Still further, those of ordinary skill in the art will readily recognize that the processing of steps 308 and 310 may be implemented utilizing multiple thread/task programming paradigms such that processing to satisfy a particular power request message may be suspended while other requests utilizing the same method as FIG. 3 (in another thread/task) may proceed. Still further, those of ordinary skill in the art will readily recognize additions or modifications to the methods of FIG. 3 to assure fairness in the allocation of power in processing multiple received power request messages and to assure that processing of multiple requests do not generate deadlock conditions among threads/tasks processing request on behalf of the various devices.

When sufficient power is deemed available to satisfy the received power request message as determined by steps 308 and 310, step 312 next allocates the requested additional power on behalf of the requesting device. As above, the allocation may involve decrementing one or more counters to indicate allocation of power to a device in one or more voltage domains.

Step 314 transmits a power grant message to the requesting device indicating availability of additional power. The power grant message may also be encoded as a SAS/SATA message including, for example, SAS/SATA frames and/or primitives. Still further, the power grant message may include indicia of the amount of power allocated for use by the device and/or the duration of time through which the device is allowed to utilize the allocated additional power.

In one exemplary embodiment, the method may continue such that step 318 receives a power status message from the device. As above, the power status message may be encoded as a SAS/SATA message including, for example, SAS/SATA frames and/or primitives. In general, the power status message may indicate any change in the status of the transmitting device as regards power utilization or consumption. In one particular exemplary embodiment, the power status message may indicate that the device no longer requires use of the previously allocated additional power. Responsive to receipt of such a power status message, step 320 then adjusts the presently available power capacity based on the power status message indicating that the previously allocated additional power is no longer required by the device. As above with respect to the power grant message, the power status message may also provide indicia of the particular amount of power no longer required by the device. Thus the device may reduce its use of the allocated additional power in stages informing the controller as each stage of reduced power consumption is encountered. Still further, the power status message may indicate a particular amount of power for each of multiple voltage levels that is no longer required by the device. Step 320 therefore adjusts the presently available power capacity in accordance with the information received from a transmitting device in the power status message.

Those of ordinary skill in the art will readily recognize numerous additional and equivalent steps in the methods of FIGS. 2 and 3 described above. Such additional and equivalent steps are omitted herein for simplicity and brevity of this discussion.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method operable in a system comprising a controller and a plurality of devices coupled to the controller, the method for management of power applied to each of the plurality of devices communicatively coupled to the controller, the method comprising:

allocating, within the controller, an initial power amount to each of the plurality of devices;

receiving a power request message in the controller from a device, the message comprising an amount of additional power required by the device;

determining, within the controller, whether sufficient power capacity is presently available; and responsive to determining that sufficient power capacity is presently available, performing the steps of:

allocating, within the controller, the additional power to the device; and transmitting a power grant message from the controller to the device to grant the device permission to use the allocated additional power.

2. The method of claim 1 wherein the step of transmitting a power grant message further comprises:

transmitting a power grant message wherein the power grant message comprises an amount of additional power allocated to the device wherein the amount of additional power allocated is different than the requested amount of additional power.

3. The method of claim 2 further comprising:

adjusting an initialization sequence within the device based on the amount of additional power allocated to the device.

4. The method of claim 1 wherein the step of transmitting a power grant message further comprises:

transmitting a power grant message wherein the power grant message comprises a time duration during which the device is permitted to use the allocated additional power.

5. The method of claim 4 further comprising:

adjusting an initialization sequence in the device based on the time duration indicated by the power grant message.

6. The method of claim 1 wherein, responsive to determining that sufficient power capacity is presently available, performing the steps of:

decreasing, within the controller, the presently available power capacity based on the allocated additional power;

receiving a power status message in the controller from the device, the power status message indicating that the device has completed use of the allocated additional power; and increasing, within the controller, the presently available power capacity based on the allocated additional power.

7. A method for managing power allocation in a storage system, the storage system comprising a storage controller coupled to a plurality of storage devices using a communication medium and protocol, the method operable in the storage controller, the method comprising:

determining a total available power capacity;

allocating an initial power amount to each of the plurality of storage devices;

adjusting the total available power capacity based on the sum of the initial power amount allocated to each of the plurality of storage devices;

receiving a power request message from a requesting device of the plurality of devices, the message comprising an additional power amount required by the device;

determining whether the total available power capacity is sufficient to provide the requested additional power amount; and responsive to a determination that the total available power capacity is sufficient to provide the requested additional power amount, performing the steps of:

allocating the requested additional power amount for the requesting device;

transmitting a power grant message to the requesting device; and adjusting the total available power capacity based on the requested additional power amount.

8. The method of claim 7 further comprising:

receiving a power status message from the requesting device indicating that a previously allocated additional amount of power is released by the requesting device; and adjusting the total available power capacity based on the power release message.

9. The method of claim 8 wherein the storage controller is a Serial Attached SCSI (SAS) storage controller and wherein each of the plurality of devices is a SAS device, wherein each of the power request message, the power grant message, and the power status message is one of a SAS frame or a SAS primitive.

10. The method of claim 8 wherein the storage controller is a Serial Advanced Technology Attachment (SATA) storage controller or a SATA port multiplier and wherein each of the plurality of devices is a SATA device, wherein each of the power request message, the power grant message, and the power status message is one of a SATA frame or a SATA primitive.

11. The method of claim 7 wherein the storage controller is one of a Serial Advanced Technology Attachment (SATA) controller, a SATA port multiplier, a SAS controller, or a SAS expander.

12. The method of claim 7 wherein the step of transmitting further comprises:

transmitting the power grant message wherein the power grant message comprises indicia of a duration of time during which the requesting device may utilize the requested additional power amount.

13. The method of claim 7 further comprising:

receiving a power status message from the requesting device indicating a change in power consumption by the requesting device.

14. The method of claim 13 further comprising:

adjusting power allocated to other devices in the system responsive to the change in power consumption of the requesting device.

15. The method of claim 7 wherein the step of receiving the power request message further comprises receiving a power request message that comprises an additional power amount for each of multiple voltage levels.

16. A system comprising:

a power supply;

a plurality of devices each device coupled to receive power from the power supply and each adapted to require varying amounts of power during operation;

a storage controller communicatively coupled with each of the plurality of devices, the controller adapted to exchange information with one or more devices of the plurality of devices to manage the consumption of power from the power supply consumed by the one or more devices by processing information received from the devices, the information comprising an amount of additional power required by the devices.

17. The system of claim 16 wherein the storage controller is a Serial Attached SCSI (SAS) controller or a SAS expander, and wherein at least one of the plurality of devices is a SAS device.

18. The system of claim 16 wherein the storage controller is a Serial Advanced Technology Attachment (SATA) controller or a SATA port multiplier, and wherein at least one of the plurality of devices is a SATA device.

19. The system of claim 16 wherein information exchanged further comprises one or more of: the amount of power allocated to a device by the controller, the duration time during which a device may use power allocated to it by the controller, and indicia to the controller of a change of power consumption by a device.

* * * * *